W. W. PITTS.
SPRING EQUALIZER SYSTEM.
APPLICATION FILED SEPT. 5, 1912.
1,076,056.
Patented Oct. 21, 1913
2 SHEETS—SHEET 1.
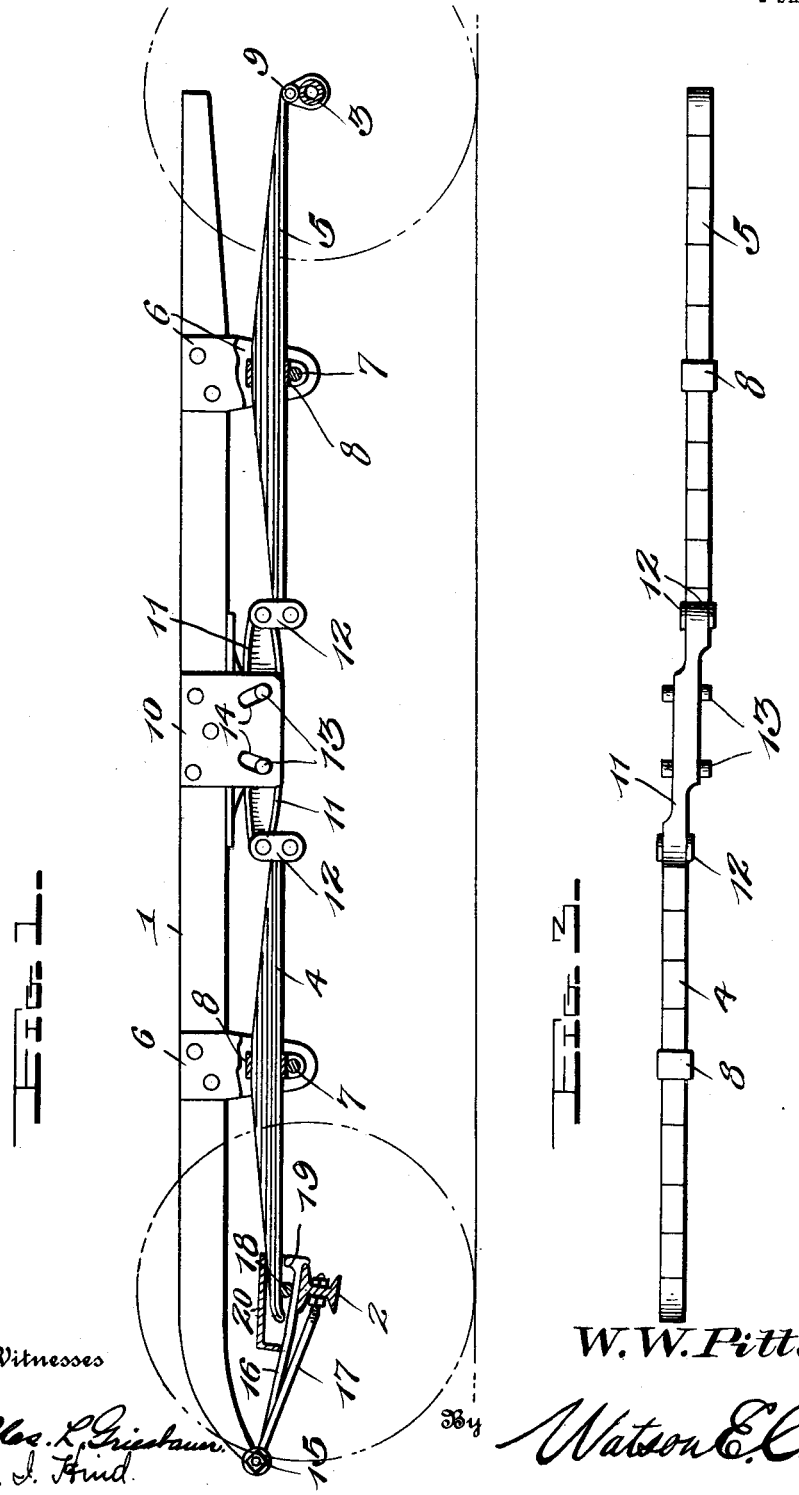
Witnesses
Chas. L. Griesbaum.
A. J. Hind.
Inventor
W. W. Pitts,
By Watson E. Coleman,
Attorney

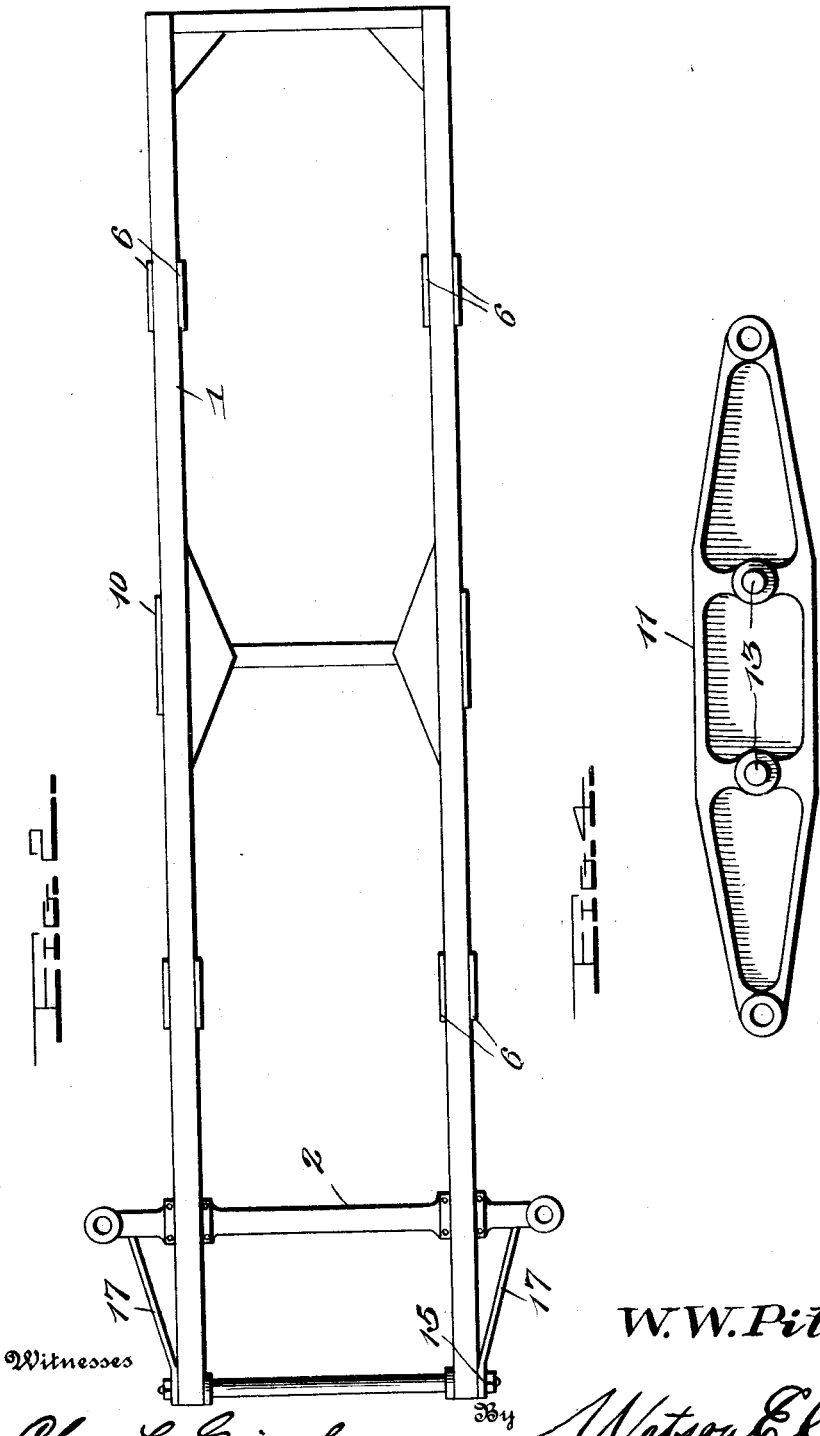

UNITED STATES PATENT OFFICE.

WILLIAM WIRT PITTS, OF AUSTIN, TEXAS, ASSIGNOR OF ONE-FOURTH TO CLARA M. PITTS AND ONE-FOURTH TO JENNIE M. PITTS, BOTH OF AUSTIN, TEXAS.

SPRING EQUALIZER SYSTEM.

1,076,056.

Specification of Letters Patent. Patented Oct. 21, 1913.

Application filed September 5, 1912. Serial No. 718,688.

*To all whom it may concern:*

Be it known that I, WILLIAM WIRT PITTS, a citizen of the United States, residing at Austin, in the county of Travis and State of Texas, have invented certain new and useful Improvements in Spring Equalizer Systems, of which the following is a specification, reference being had to the accompanying drawings.

This invention relates to certain new and useful improvements in spring equalizing systems for motor vehicles, and more particularly to an equalizer of the cantaliver type, the invention having for its primary object the provision of simple and novel means whereby stress exerted at any point is equally distributed to the equalizing springs and entirely absorbed and shock or jar to the body of the vehicle thus obviated.

Another object of the invention is to provide an equalizing system of the above character including a pair of springs carried by the vehicle frame, and equalizing means connecting the opposed ends of said springs whereby stress exerted upon one spring will be partially transmitted through the equalizing means to the other of said springs.

The invention has for a further object the provision of a simple, durable and efficient construction of the above character, the parts of which may be manufactured at small cost and readily assembled in their proper operative positions.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation illustrating the preferred embodiment of my invention applied to the body of a vehicle; Fig. 2 is a plan view of the same; Fig. 3 is a plan view of the shock absorbing springs and the equalizer connecting the same; and Fig. 4 is a detail perspective view of the equalizing member.

Referring in detail to the drawings, 1 designates the frame or chassis of a motor vehicle and the numerals 2 and 3 indicate the front and rear supporting axles respectively upon opposite ends of which the wheels of any preferred construction are mounted in the ordinary manner.

The subject matter of the present invention includes a pair of vehicle springs 4 and 5 respectively, each of which consists of a plurality of spring metal plates arranged upon each other as is common in springs of this type. These springs intermediate of their ends are disposed between the spaced hanger plates or brackets 6 which are bolted or otherwise secured to the longitudinal bars of the vehicle frame. To the central portion of each spring, a bearing member 8 is secured, said member being fulcrumed for rocking movement upon a stud or bolt 7 connecting the lower ends of the hanger plates 6. The rear end of the spring 5 is pivotally connected as at 9 to the rear vehicle axle 3 while the forward end of the spring 4 is movably mounted upon the front axle 2 of the vehicle, the inner ends of said springs being connected by the equalizer proper which will now be described in detail. To the longitudinal bars of the frame or chassis, intermediate of their ends, the depending plates 10 are secured. Between these plates, the equalizing beam 11 which is preferably of I-form in cross section is fulcrumed for vertical tilting movement. The ends of this I-beam are pivotally connected to the inner opposed ends of the springs 4 and 5 respectively by means of links 12. A pair of studs 13 project laterally from each side of the I-beam 11, said studs being disposed equidistant upon opposite sides of the longitudinal center of said beam. These studs have limited movement in arcuate slots 14 provided in each of the plates 10. The studs are preferably threaded or otherwise removably fitted into the openings in the equalizer beam.

The forward ends of the longitudinal frame bars are connected by means of a transverse brace rod 15, and to the ends of this rod, the forward ends of the lead bars 16 are pivotally connected, the other ends of said bars being suitably secured to the forward vehicle axle 2. Sway braces 17 are also connected at their forward ends to the ends of the brace rod 15 and have their other ends bolted or otherwise rigidly secured to the axle 2. From this construction, it is apparent that the front axle may move freely in a vertical plane with relation to the vehicle frame while the lead bars and sway braces will retain the front axle against horizontal movement when the vehicle rounds a curve.

The upper face of each lead bar has mounted thereon a roller 18 upon which the outer end of the spring 4 rests, thereby providing a flexible connection between said spring and the front axle, and permitting of the vertical movement of said axle. The inner end of each of the lead bars is provided with an angular portion or flange 19 which engages the under face of the front end of the spring 4 when the axle 2 is forced upwardly by the impact of the vehicle wheels with an obstruction or uneven road surface. A suitable housing 20 incloses the outer end of the spring 4 and the roller 18 is arranged between the same and the lead bar. This housing retains the spring and roller in proper position upon the lead bar and protects the same against accumulations of dirt or mud so that the proper action of the parts will be assured. It is understood that this arrangement of the vehicle supporting springs and the equalizer connecting the same is duplicated upon opposite sides of the machine frame.

From the foregoing, it is thought that the construction and operation of the device will be clearly and fully understood.

In the event that either of the vehicle supporting axles is subjected to a sudden shock or jar, such shock will be transmitted through the springs 4 or 5 as the case may be to the equalizing beams 11, which will be tilted or rocked and thereby distribute a part of the strain or pressure to the other set of springs. Thus it is seen that the shock or jar is equalized and absorbed by the respective springs, irrespective of whether the direct application of the pressure is assumed by the front or rear vehicle supporting axle. It is further to be noted that the equalizing beam is fulcrumed at two points between the bracket plates 10 so that the same may tilt from a point at either side of its center and thus keep the load properly balanced.

It will further be seen that when the springs 4 or 5 are subjected to pressure, the beam 11 will be swung upon its pivot 13 which is nearest to the spring to which the pressure is directly applied, thus giving the other of the springs the benefit of the longer leverage which materially increases the efficiency of the device. When the road surface being traveled is comparatively level, the projections 13 of the equalizing beam will rest within the lower ends of the slots 14 and the springs 4 and 5 will then individually absorb the ordinary vibration exerted upon the respective axles.

While I have above described the preferred construction and arrangement of the several elements employed, it will be understood that in putting the invention into practice, I do not desire to be limited thereto as the same is susceptible of considerable modification in the form, proportions and arrangement of the parts without departing from the essential features or sacrificing any of the advantages of the invention.

Having thus fully described my invention what I claim as new and desire to secure by Letters Patent is:—

1. The combination with a motor vehicle frame, axles carried thereby, brackets depending from said frame, springs pivotally mounted at their medial portion to said brackets, the outer ends of said springs being connected to said axles, an I-beam pivotally connected to the inner ends of said springs, bearing plates depending from said frame and having alining arcuate slots formed therein and the said I-beam being pivotally mounted within said slots substantially as and for the purpose specified.

2. The combination with a motor vehicle frame, of springs fulcrumed intermediate of their ends upon said frame, one end of each spring being connected to the front and rear vehicle axles respectively, an equalizing beam, spaced fulcrum pins carried by said beam, hanger plates fixed to the frame and having means to accommodate said pins and admit of their limited movement, said pins providing independent fulcrums for the beam, and link connections between the ends of said beams and the inner ends of the respective springs.

3. The combination with a motor vehicle, of a pair of springs pivotally carried thereby, a double fulcrum equalizer connecting the inner ends of said springs, the outer end of one spring being pivotally connected to the rear axle of the vehicle, the outer end of the other said spring being slidably connected to the front axle of the vehicle, lead bars pivotally connected at one end of the said frame, the opposite ends of said lead bars being permanently connected to the front axle of the vehicle and sway braces pivotally connected to the said frame and permanently connected to the front axle substantially as and for the purpose specified.

4. The combination with a vehicle frame and supporting axles therefor, of a pair of springs pivotally mounted intermediate of their ends upon the frame and connected at one of their ends to the front and rear vehicle axles respectively, a hanger plate secured to the frame and provided with spaced slots, an equalizing beam having vertical rocking movement upon said plate, spaced pins projecting laterally from the beam and disposed in said slots to limit the tilting movement of the beam, said pins providing independent fulcrums for the beam in its rocking movement, and means connecting the opposite ends of said beam to the inner ends of the springs.

5. The combination with a vehicle frame and supporting axles therefor, of spaced front and rear springs interposed between the frame and its supporting axles to yieldingly prevent vertical relative movement thereof, an equalizing device connecting said springs, lead bars pivotally connected to the forward end of the frame, and secured to the front axle, a housing in which the forward end of the front supporting spring is disposed, and a roller arranged within said housing between the lead bar and said spring.

In testimony whereof I hereunto affix my signature in the presence of two witnesses.

WILLIAM WIRT PITTS.

Witnesses:
W. B. PETERSON,
CHESTER THRASHER.

Copies of this patent may be obtained for five cents each, by addressing the "Commissioner of Patents, Washington, D. C."